I. S. MERRELL.
PROCESS FOR CHANGING THE CONSISTENCY OF LIQUIDS CONTAINING SOLIDS.
APPLICATION FILED OCT. 19, 1916.
1,225,348.
Patented May 8, 1917.
2 SHEETS—SHEET 1.
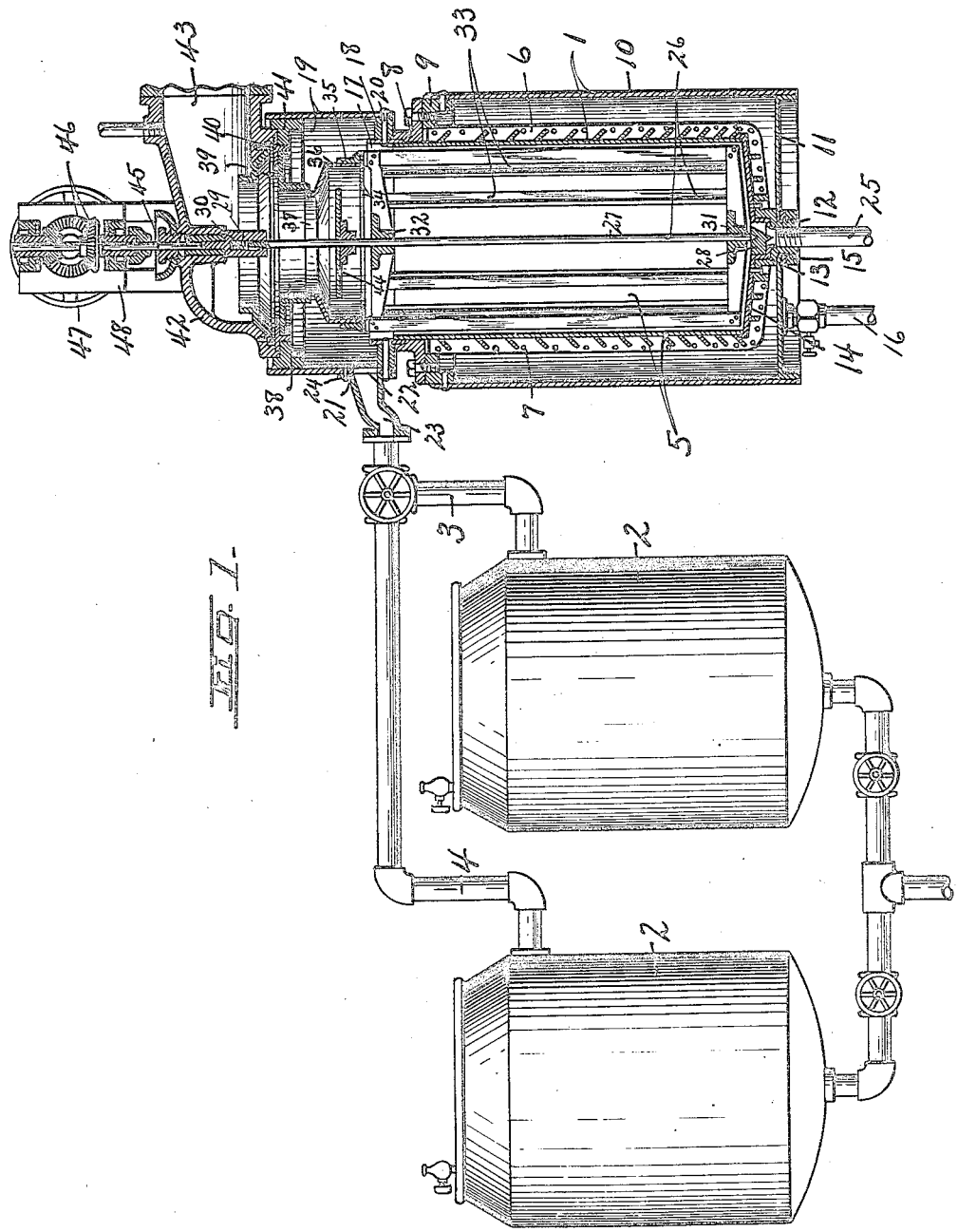

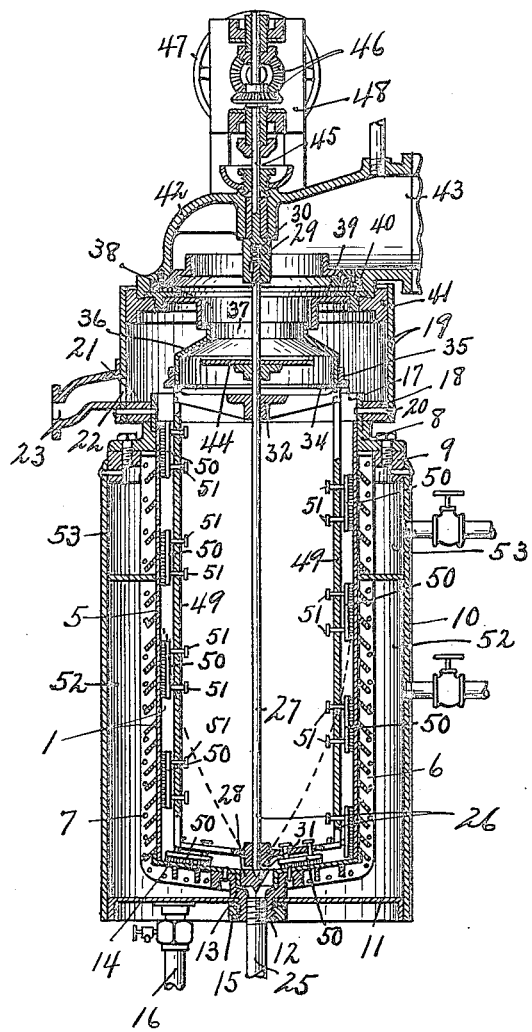

UNITED STATES PATENT OFFICE.

IRVING S. MERRELL, OF SYRACUSE, NEW YORK, ASSIGNOR TO MERRELL-SOULE COMPANY, OF SYRACUSE, NEW YORK, A CORPORATION OF NEW YORK.

PROCESS FOR CHANGING THE CONSISTENCY OF LIQUIDS CONTAINING SOLIDS.

1,225,348.        Specification of Letters Patent.        Patented May 8, 1917.

Application filed October 19, 1916. Serial No. 126,524.

*To all whom it may concern:*

Be it known that I, IRVING S. MERRELL, a citizen of the United States of America, and resident of Syracuse, in the county of Onondaga, in the State of New York, have invented new and useful Improvements in Processes for Changing the Consistency of Liquids Containing Solids, of which the following, taken in connection with the accompanying drawings, is a full, clear, and exact description.

This invention relates to certain improvements in process for changing the consistency of liquids containing solids, and I have discovered that although the said process is particularly adapted for the concentration of milk, yet it may be advantageously applied to the concentration of all substances containing liquid for the purpose of changing the condition or consistency thereof, and is closely related to my copending application, Serial No. 108,383, filed July 10, 1916.

The present known commercial process of condensing milk consists in placing the milk in a large jacketed pan containing steam coils, and subjecting the milk under vacuum to sufficient heat to boil the same while milk is drawn into the pan to replace the moisture evaporated until a pan substantially full of condensed milk has been obtained. The vacuum is then broken and the contents of the pan entirely withdrawn. This operation consumes from two to three hours and subjects the milk to the heat of the jacket and steam coils for this period of time. Different portions of the milk are subjected to different temperatures, and the more viscid the milk becomes, the more uneven is the effective heating, for the reason that as the density of the liquid increases it moves more slowly as there is little tendency, in the absence of mechanical means, for the milk to move from contact with the heating surface and allow other milk to take its place.

In order to produce boiling throughout the mass of milk, it is necessary to heat the milk adjacent the heating surfaces to a much higher temperature than the temperature theoretically necessary for boiling in vacuum, and there is, therefore, an entire lack of uniformity in the subjection of the different particles of the milk to the heat.

The known commercial operation is, of course, carried on by batches,—that is, a quantity of milk is forced into the pan, replenished as the operation continues, and allowed to remain there subjected to the heat for two or three hours, and then drawn off and a second batch is placed in the pan and boiled down in the same manner. Cool entering milk is continually being mixed, and its temperature averaged, with the heated condensed milk in the pan.

The process discovered by me and herein disclosed is a continuous one and involves a centrifugally produced flowing body of milk having a continuous rotary and longitudinal movement and a parabolic interior form constituting a zone for the passage of vapor.

The centrifugal force, as for instance of a rotary beater, constantly tends to arrange the heaviest parts of the liquid against the hot wall or surface, but the heat lightens the liquid by producing vapor in it and thus compels it to retreat from the wall to make place for the non-vaporized heavier portion, thus constantly arranging the light vapor-containing liquid nearer the center of the beater where its vapor may escape most readily, and constantly arranging the non-vaporized liquid nearest the heated surface where it receives the greatest heat.

By reason of this action, the material in contact with the heated surface is liquid until the instant of its displacement from contact with such surface. The moment it boils, it is immediately displaced by the heavier non-boiling liquid and moved inwardly, and the vapor, separated from the liquid by the centrifugal action of the beater, is discharged, while the liquid containing the solids is thrown back into the moving body of milk.

This automatic action of the centrifugal force constantly moving the cooler portions of the liquid into contact with the heated wall and constantly withdrawing the boiling portion with its bubbles, and continuously heating all portions of the milk not in contact with the heated surface, by transfer of heat from the inwardly moving bubbles, accomplishes a uniform heating of the milk and practically eliminates scorching of the material which occurs when bubbles remain in contact with the heating surface.

The milk may be drawn in at the bottom of a suitable vertically disposed cylindrical chamber, forced spirally upward along the interior wall of the chamber, and discharged at the top.

During its passage through the chamber, the body of milk is at all times in contact with the heated surface and is uniformly subjected to the heat, whereby the evaporation and condensation is uniform and is effected during the relatively short period of time consumed by the passage of the milk through the chamber, approximately a minute and a quarter to condense skim milk 3 or 4 to 1 in an apparatus of predetermined size operated at predetermined beater speeds.

When the mechanically forced flowing body of milk reaches the vaporizing temperature, it is not cooled by, or its temperature averaged with, a constantly replenished adjacent body of milk of different temperature. All of the liquid passing through the chamber is continuously and uniformly heated by contact with the heated wall and by the transfer of heat from the centrifugally moving bubbles.

In the specific disclosure of this application, the milk travels spirally upward upon the interior surface of a heated cylinder in a body of gradually decreasing thickness from the bottom to the top of the cylinder, the variance in the degree of thickness from the bottom to the top of the apparatus depending upon the speed of the rotary centrifugal means within the cylinder.

The thin entering milk exists in the bottom of the cylinder in a mass of considerable radial depth under normal beater speeds, such as a speed of 1800 lineal feet per minute, while the finished condensed product is discharged from the upper end of the cylinder in substantially film order.

Nevertheless, in this apparatus the milk is substantially uniformly heated, due to the transference of heat by bubbles centrifugally moved inwardly through the mass of milk, and to the constant displacing of the lighter portions of the liquid by the centrifugally moved heavier cooler portions, and in the operation of this apparatus the most extensive transfer of heat by bubbles takes place in the thin liquid at the bottom of the cylinder where the transfer is most easily and effectively accomplished.

The process described herein is applicable to the condensation of milk, including skim milk and milk containing butter fats, such as whole milk and cream, and to the production of skim milk powder and milk powder containing butter fats, as whole milk powder or cream powder.

The condensing process herein described is peculiarly and specifically adapted for use in the production of milk powder by the spraying process described in United States Letters Patent No. 860,929, dated July 23, 1907, and claims for such combination are contained in my said co-pending application, Serial No. 62,243.

In condensing apparatus of this character, operating at disrupting temperatures, it is essential that the milk be cooled immediately upon completion of the condensing or concentrating operation, and a feature of this invention resides in the method and apparatus for accomplishing this purpose to prevent thickening of the milk and chemical change which would take place if the product were permitted to cool in a normal manner.

It is found desirable and necessary to immediately reduce the temperature of the condensed liquid below disrupting temperatures. As an instance, if the condensed liquid at the termination of the condensing operation has a temperature of 210° to 212°, such temperature should immediately be reduced, preferably 40° or 50° to prevent chemical change and thickening of the liquid.

Other objects and advantages will appear from the following description, taken in connection with the following drawings, in which—

Figure 1 is an elevation, partly in section, of an apparatus for carrying out the process herein.

Fig. 2 is a view of a slightly different and preferred form of concentrating apparatus.

The apparatus broadly, as shown in Fig. 1, comprises a condensing or concentrating apparatus —1— and a series of milk-receiving tanks —2—, each connected to the apparatus —1— by pipes —3— and —4— for the passage of liquid to either or both of the tanks.

The liquid-condensing apparatus comprises a vertically arranged cylindrical chamber or heater —5—, preferably formed of thin sheet metal, such as sheet tin, and in the particular structure shown comprises a plurality of segmental sections having their adjacent longitudinal edge portions flanged outwardly and in contact to form a tight joint which may be made liquid tight by solder or other well-known means, such flanges held in contact and connected together by suitable reinforcing bars —6— positioned upon opposite sides of associated flanges and connected together by bolts or rivets —7—.

The bottom of the cylindrical chamber or heater may be formed of sector sections conforming to the segmental sections of the cylinder and connected together to form a unitary tight structure.

Any form of cylinder, however, having a closed bottom may be utilized.

The upper ends of the bars —6— may be flanged at right angles and secured to castings —8—, which castings, in turn, are secured to castings —9— carrying a cylindrical jacket —10— surrounding the cylinder —5— and having a suitable closure plate —11— provided with a central opening fitted over a boss —12— formed upon a casting —13— riveted to the bottom —14— of the heater —5—. The jacket —10— is provided with a suitable steam inlet for steam or other heating media, of any usual and well known construction, not necessary to herein illustrate or further describe.

The closure plate may be secured relative to the casting —13— in any suitable manner, as by nut and lock nut —15—. The plate —11— carries a suitable outlet pipe —16— for condensation and the like, as shown in my said copending application.

As shown in Fig. 1, the entire chamber between the jacket and the cylinder is adapted to receive a heating fluid, such as steam, under suitable pressure to properly heat the cylinder to vaporize a portion of the liquid constituents of the material moving thereover.

The upper edges of the segmental members constituting the lower portion of cylinder —5— terminate adjacent the circular casting —8— and the casting —8— is provided with a stepped portion upon its inner side, in which a cylindrical plate-like member —17— is adapted to be seated, these parts being secured to each other and to the upper edge of segmental portions of cylinder —5— in any suitable manner.

A ring member —18— of sufficient interior circumference is tightly fitted over the plate —17— and carries a cylindrical sheet metal section —19—. A series of rivets or bolts —20— having their ends counter-sunk in the member —17— serve to connect these members together and the ring —19— is spaced a sufficient distance from the upper edge of the member —17— to form a liquid-receiving channel —21— between the member —17— and the section —19—, and this channel is provided with a suitable outlet —22— and a discharge pipe —23— alined with the outlet and connected to the ring —18— and section —19— by the rivets —20— and —24—.

The interiorly threaded boss —12— is adapted to receive the exteriorly threaded pipe —25— for conveying the liquid to the heater —5—.

Within the heater or chamber —5— is positioned a beater —26— comprising, in Fig. 1, a vertically arranged central shaft —27— having its lower end journaled in a spider —28— supported on the bottom —14— and the casting —13—, and its upper end removably mounted in and keyed to a hub —29— provided with a suitable end thrust spring —30— for holding the shaft to its bearing in the spider —28—.

The shaft —27— carries a pair of spaced castings —31— and —32—, the casting —31— arranged adjacent the interior of the lower surface of the heater —5— and the casting —32— arranged in a plane adjacent the upper edge of the plate —17—.

These castings —31— and —32— comprise a plurality of radially extending arms, to the upper ends of which upright bars —33— are secured. Any suitable number of upright bars may be provided, as likewise any suitable number of radiating arms, upon the castings —31— and —32—, to which respective ends of the bars are secured.

The upper casting —32— carries a plate-like ring —34—, from which posts —34— project upwardly, and a suitable deflecting hood —36— is secured to the posts in any suitable manner, as by soldering, rivets, or the like, said hood spaced vertically a short distance from the upper surface of plate —34— to permit the passage of liquid between the plate and hood.

The hood is further provided with a vertical flange —37— rotating within a downwardly depending flanged portion —38— upon a disk —39— carried by a T-shaped ring —40— secured by screws, or otherwise, to a ring-shaped casting —41—, which latter is mounted within and secured to the section —19— by rivets or otherwise.

A suitable cap —42— coacts with the casting —41— and ring —40— to form a suitably closed joint, the cap —42— being provided with an outlet —43— for the escape of vapor and the like.

A suitable deflecting plate —44— is mounted upon shaft —27— intermediate the ring —34— and coöperating flanges —37— and —38— and alined with the opening through plate —34— and the outlet through said flanges to prevent the direct passage of vapor.

The hub —29— is provided with a projecting shaft portion —45— journaled in bearings in the cap —42— and provided at its upper end with any suitable driving means, as gears —46—, and pulley —47—, which may be mounted upon the upright posts —48—, as shown in my said copending applications.

In Fig. 2, I have shown a preferred form of construction, in which the beater is of somewhat different construction and embodies two or more upright arms —49— carried by the castings —31— and —32—, upon shaft —27—, which arms, each carry a series of brushes —50— which may be of any suitable construction desired, either metal, bristle or the like.

Preferably, these brushes are mounted upon studs or bolts —51— slidably mounted in the bars —49— so as to be thrown out against the interior surface of cylinder —5— by centrifugal force.

The brushes may, as shown, be arranged in staggered relation, being spaced apart upon each arm, but so arranged as to cover the entire interior surface of the cylinder, particularly the heated surface of the cylinder, as hereinafter described.

For the purpose of cooling the milk, as hereinbefore described, to prevent thickening and other chemical change, the jacket is divided into two portions —52— and —53— by a partition —54—, the lower portion —52— adapted to receive a heating fluid, such as steam, to so heat the wall of the cylinder —5— as to produce vaporization of the liquid constituents of the milk, to condense the same to the desired degree, the upper chamber —53— adapted to receive a cooling fluid or refrigerant to immediately cool the liquid, as described, below disrupting temperatures, after which it is discharged from the machine. The chamber —53— is provided with an inlet and an outlet for cooling fluid, such inlet and outlet being of any usual and well known construction, not necessary to herein further illustrate or describe.

It will be readily apparent that any suitable form of brushes or wipers may be utilized for cleaning and polishing the surface of the cylinder, to prevent adherence of the solid constituents, of such a character as casein in milk.

The other features of the apparatus are substantially identical with the structure disclosed in Fig. 1.

In operation, the milk is allowed to enter the cylindrical heater —5— through pipe —25— and the amount admitted may be regulated by suitable valves, not shown.

The milk passes upwardly through the spider, and under the centrifugal action of the beater is forced in continuous rotary and longitudinal movement upwardly along the interior of the cylinder, and gradually merges from a body of liquid at the bottom of the cylinder into a substantial film at the upper end of the cylinder, at which point it is discharged.

The body of liquid has an interior parabolic formation constituting a parabolic zone for the reception and passage of vapor, the focus of the parabola being toward the bottom of the cylinder, the milk being discharged from the upper end of the cylinder in substantially film form.

By the phrase "disrupting temperature" as used in the specification hereof, is meant a temperature to which milk, under normal conditions, cannot be subjected even for relatively brief periods of time, without material injury to the constituents. The exact length of such time varies somewhat under different conditions. The mechanically forced movement of the milk in layer form and the separation of the vapor from the liquid by centrifugal force, permits condensation of the milk by subjecting the same to such disrupting temperature for a brief period of time without material injury during the process.

The brushes shown and described in Fig. 2 are quite essential to the operation of the apparatus at atmospheric pressure to prevent the adherence and burning of material upon the surface and to keep the surface polished and clean, and although I have shown and described one particular form of the same, and one particular method of mounting the same, I do not desire to limit myself to any particular form or any particular method of mounting, nor do I desire to limit myself to any particular form, shape or construction of apparatus for carrying out the method herein, apart from the vertical arrangement of the apparatus where specifically included in the claims, in combination with centrifugal means for forming the liquid in a body having an interior parabolic shape, the entire body being movable endwise of the cylinder.

What I claim is:

1. The process of concentrating a substance containing liquid consisting in introducing the substance into a container of substantially circular cross section heated to a temperature sufficient to vaporize liquid constituents of the substance at substantially atmospheric pressure, shaping the substance in a unitary layer of continuous exterior conformation and with an interior substantially unobstructed vapor zone of paraboloid form, rapidly moving the layer circularly over the surface and simultaneously causing the entire body of substance to move from the point of introduction toward the opposite end of the container, permitting the substance to escape after treatment, and permitting the vapor to escape inwardly from the layer and freely from the container.

2. The method of condensing liquids consisting in introducing the liquid into a vertically arranged cylindrical heated container, centrifugally shaping the liquid with an interior vapor zone of paraboloid form and moving the liquid endwise of the container, and simultaneously wiping the inner surface of the container.

3. The method of condensing liquids consisting in introducing the liquid into a vertically arranged cylindrical heated container, centrifugally shaping the liquid with an interior vapor zone of paraboloid form and moving the liquid endwise of the container, and mechanically removing the adhering particles from the surface of the container without interrupting the movement of the body of liquid.

4. The process of condensing liquids consisting in introducing the liquid into the bottom of a vertically arranged cylindrical container, heating the container, centrifugally causing the liquid to move upwardly upon the interior surface of the container, and wiping the interior surface of the container.

5. The method of condensing liquids consisting in centrifugally causing the liquid to move rotarily and longitudinally of a vertically arranged heated container, and polishing the surface of the container.

6. The method of concentrating a substance containing liquid consisting in centrifugally causing the liquid to move rotarily and longitudinally of a vertically arranged heated container, and mechanically removing the adhering particles from the surface of the container without interrupting the movement of the body of liquid.

7. The process of condensing liquids consisting in centrifugally causing the liquid to move vertically along the interior surface of a cylindrical container, heating the container to a temperature sufficient to vaporize liquid constituents of the material treated at substantially atmospheric pressure, discharging the liquid from the container at a point remote from the place of introduction, and wiping the surface of the container.

8. The process of concentrating a substance containing liquid consisting in introducing the substance into a vertically arranged container of substantially circular cross section heated to a temperature sufficient to vaporize liquid constituents of the substance at substantially atmospheric pressure, shaping the substance in a layer upon the interior surface of the container, rapidly moving the layer circularly over the surface and simultaneously causing the entire body of substance to move from the point of introduction toward the opposite end of the container, permitting the substance to escape after treatment, and permitting the vapor to escape inwardly from the layer and freely from the container.

9. The process of concentrating a substance containing liquid consisting in introducing the substance into a vertically arranged container of substantially circular cross section heated to a temperature sufficient to vaporize liquid constituents of the substance at substantially atmospheric pressure, shaping the substance in a layer upon the interior surface of the container, rapidly moving the layer circularly over the surface and simultaneously causing the entire body of substance to move from the point of introduction toward the opposite end of the container, permitting the substance to escape after treatment, permitting the vapor to escape inwardly from the layer and freely from the container, and simultaneously wiping the inner surface of the container.

10. The process of concentrating a substance containing liquid consisting in introducing the substance into a container of substantially circular cross section heated to a temperature sufficient to vaporize liquid constituents of the substance at substantially atmospheric pressure, shaping the substance in a unitary layer of continuous exterior conformation and with an interior substantially unobstructed vapor zone of paraboloid form, rapidly moving the layer circularly over the surface and simultaneously causing the entire body of substance to move from the point of introduction toward the opposite end of the container, permitting the substance to escape after treatment, permitting the vapor to escape inwardly from the layer and freely from the container, and wiping the surface of the container.

11. The process of concentrating a substance containing liquid consisting in introducing the substance into a vertically arranged container of substantially circular cross section heated to a temperature sufficient to vaporize liquid constituents of the substance at substantially atmospheric pressure, shaping the substance in a unitary layer of continuous exterior conformation and with an interior substantially unobstructed vapor zone, rapidly moving the layer circularly over the surface, and simultaneously causing the entire body of substance to move from the point of introduction toward the opposite end of the container, permitting the substance to escape after treatment, and permitting the vapor to escape inwardly from the layer and freely from the container.

12. The process of concentrating a substance containing liquid consisting in introducing the substance into a vertically arranged container of substantially circular cross section heated to a temperature sufficient to vaporize liquid constituents of the substance at substantially atmospheric pressure, shaping the substance in a unitary layer of continuous exterior conformation and with an interior substantially unobstructed vapor zone, rapidly moving the layer circularly over the surface, simultaneously causing the entire body of substance to move from the point of introduction toward the opposite end of the container, permitting the substance to escape after treatment, permitting the vapor to escape inwardly from the layer and freely from the container, and mechanically removing the adhering particles from the surface of the container without interrupting the movement of the body of liquid.

13. The process of concentrating a substance containing liquid consisting in introducing the substance into a vertically arranged container of substantially circular cross section heated to a temperature sufficient to vaporize liquid constituents of the substance at substantially atmospheric pressure, shaping the substance in a unitary layer of continuous exterior conformation and with an interior substantially unobstructed vapor zone, rapidly moving the layer circularly over the surface, simultaneously causing the entire body of substance to move from the point of introduction toward the opposite end of the container, permitting the substance to escape after treatment, permitting the vapor to escape inwardly from the layer and freely from the container, and simultaneously wiping the inner surface of the container.

14. The process of concentrating a substance containing liquid consisting in introducing the substance into a container of substantially circular cross section having an artificially heated and artificially cooled portion arranged in succession, shaping the substance in a layer upon the interior surface of the container, rapidly moving the layer circularly over the surface, and simultaneously causing the entire body of substance to move from the point of introduction across the artificially heated surface of the container to vaporize liquid constituents of the substance and then across the artificially cooled surface to immediately cool the concentrated substance, permitting the substance to escape after treatment, and permitting the vapor to escape inwardly from the layer and freely from the container.

15. The process of condensing milk consisting in introducing the milk into a container of substantially circular cross section having an artificially heated and artificially cooled portion arranged in succession, shaping the milk in a layer upon the interior surface of the container, rapidly moving the layer circularly over the surface and simultaneously causing the entire body of milk to move from the point of introduction across the artificially heated surface of the container to vaporize liquid constituents of the milk and then across the artificially cooled surface to immediately cool the concentrated milk, permitting the milk to escape after treatment, and permitting the vapor to escape inwardly from the layer and freely from the container.

16. The process of condensing milk consisting in centrifugally moving the milk in layer form rotarily and longitudinally upon the interior surface of a container of substantially circular cross section having an artificially heated and artificially cooled portion arranged in succession, permitting the milk to escape after treatment, permitting the vapor to escape inwardly from the layer and freely from the container.

17. The process of condensing milk consisting in introducing the milk into a container of substantially circular cross section heated to a temperature sufficient to vaporize liquid constituents of the milk at substantially atmospheric pressure, shaping the milk in a unitary layer of substantially continuous exterior conformation and with an interior vapor zone of paraboloid form, rapidly moving the layer circularly over the surface and simultaneously causing the entire body of milk to move from the inlet toward the outlet from the chamber, permitting the milk to escape after treatment, and permitting the vapor to escape inwardly from the layer and freely from the container.

18. The process of condensing milk consisting in introducing the milk into a vertically arranged container of substantially circular cross section heated to a temperature sufficient to vaporize liquid constituents of the milk at substantially atmospheric pressure, centrifugally causing the milk to move rotarily and longitudinally upon the interior surface of the container, and mechanically removing the adhering particles from the surface of the container without interrupting the movement of the body of milk.

19. The process of condensing milk consisting in introducing the milk into a vertically arranged container of substantially circular cross section heated to a temperature sufficient to vaporize liquid constituents of the milk at substantially atmospheric pressure, shaping the milk in a layer upon the interior surface of the container, rapidly moving the layer circularly over the surface and simultaneously causing the entire body of milk to move from the inlet toward the outlet from the container, permitting the vapor to escape inwardly from the layer and freely from the container, discharging the milk from the container in substantially the same succession as it was introduced into the container, and mechanically removing adhering particles from the surface of the container without interrupting the movement of the body of milk.

20. The process of condensing milk consisting in introducing the milk into a vertically arranged container heated to a temperature sufficient to vaporize liquid constituents of the milk at substantially atmospheric pressure, shaping the milk in a unitary layer of continuous exterior conformation upon the interior surface of the container, rapidly moving the layer circularly over the surface and simultaneously causing the entire body of milk to move from the point of introduction toward the opposite end of the container, permitting the milk to escape after treatment, permitting the vapor to escape inwardly from the layer and freely from the container, and mechanically removing the adhering particles from the surface of the container without interrupting the movement of the body of milk.

21. The process of condensing liquids consisting in moving the liquid over the interior surface of a container of substantially circular cross section having an artificially heated and an artificially cooled portion arranged in succession, and wiping the interior surface of the container.

In witness whereof I have hereunto set my hand this 17th day of October, 1916.

IRVING S. MERRELL.

Witnesses:
E. A. THOMPSON,
HOWARD P. DENISON.